United States Patent [19]

Chung et al.

[11] Patent Number: 5,145,568
[45] Date of Patent: Sep. 8, 1992

[54] NONAQUEOUS CATHODIC ELECTROCOAT PIGMENT PASTE

[75] Inventors: Ding Y. Chung, Rochester Hills; Tapan K. Debroy, Shelby Township; Sioe-Heng A. Tjoe, Troy, all of Mich.

[73] Assignee: E. I. du Pont de Nemours and Company, Wilmington, Del.

[21] Appl. No.: 629,476

[22] Filed: Dec. 18, 1990

Related U.S. Application Data

[63] Continuation-in-part of Ser. No. 599,285, Oct. 18, 1990.

[51] Int. Cl.$^5$ .............................................. C25D 13/10
[52] U.S. Cl. ................................ 204/181.7; 204/181.4; 524/901
[58] Field of Search ........................... 204/181.7, 181.4; 524/901

[56] References Cited

U.S. PATENT DOCUMENTS

| | | | |
|---|---|---|---|
| 2,544,636 | 3/1951 | Peck | 260/34.2 |
| 4,058,499 | 11/1977 | Sekmakas et al. | 260/29.6 RW |
| 4,104,229 | 8/1978 | Sekmakas et al. | 260/29.6 RW |
| 4,110,292 | 8/1978 | Sekmakas et al. | 260/29.6 RW |
| 4,186,124 | 1/1980 | Schimmel et al. | 260/37 EP |
| 4,196,016 | 4/1980 | Simon | 106/309 |
| 4,230,552 | 10/1980 | Schimmel et al. | 204/181 C |
| 4,257,951 | 3/1981 | Matrick | 260/314.5 |
| 4,278,601 | 7/1981 | Wheeler et al. | 260/314.5 |
| 4,287,000 | 9/1981 | Buckwalter | 106/309 |
| 4,313,766 | 2/1982 | Barraclough et al. | 106/288 Q |
| 4,371,643 | 2/1983 | Thomas | 524/88 |
| 4,404,036 | 9/1983 | Donegan | 106/308 M |
| 4,410,657 | 10/1983 | Loch | 204/181.7 |
| 4,455,173 | 6/1984 | Jaffe | 106/288 Q |
| 4,522,654 | 6/1985 | Chisvette et al. | 106/288 Q |
| 5,035,785 | 7/1991 | Debroy et al. | 204/181.7 |

*Primary Examiner*—John Niebling
*Assistant Examiner*—Kishor Mayekar
*Attorney, Agent, or Firm*—Hilmar L. Fricke

[57] ABSTRACT

An electrodepositable cationic electrocoating bath containing a nonaqueous pigment paste containing organic solvent. The use of an organic solvent in the place of an aqueous solvent minimizes or eliminates foaming in the process of making the pigment paste.

14 Claims, No Drawings

NONAQUEOUS CATHODIC ELECTROCOAT PIGMENT PASTE

CROSS REFERENCE TO RELATED APPLICATION

This application is a continuation-in-part of Ser. No. 07/599,285 filed Oct. 18, 1990.

TECHNICAL FIELD

The field of art to which this invention pertains is electrodepositable cationic baths containing a nonaqueous pigment paste.

BACKGROUND

The coating of electrically conductive substrates by electrodeposition is a well known and important industrial process. (For instance, electrodeposition is widely used in the automotive industry to apply primers to automotive substrates). In this process, a conductive article is immersed as one electrode in a bath of a coating composition of an aqueous emulsion of film-forming polymer. An electric current is passed between the article and a counter-electrode in electrical contact with the aqueous emulsion, until a desired coating is produced on the article. In a cathodic electrocoating process the article to be coated is the cathode and the counter-electrode is the anode.

Resin compositions used in the bath of cathodic electrodeposition process are also well known in the art. These resins are typically made from polyepoxide resins which have been chain extended and then an adduct is formed to include a nitrogen in the resin. Nitrogen is typically introduced through reaction with an amine compound. Typically these resins are blended with a crosslinking agent and then neutralized with an acid to form a water emulsion which is usually referred to as a principal emulsion.

The principal emulsion is combined with a pigment paste, coalescent solvents, water, and other additives (usually at the coating site) to form the electrodeposition bath. The electrodeposition bath is placed in an insulated tank containing the anode. The article to be coated is made the cathode and is passed through the tank containing the electrodeposition bath. The thickness of the coating is a function of the bath characteristics, the electrical operating characteristics, the immersion time, and the like.

The coated object is removed from the bath after a given amount of time. The object is rinsed with deionized water and the coating is cured typically in an oven at sufficient temperature to produce crosslinked coating.

The prior art of cathodic electrodepositable resin compositions, coating baths, and cathodic electrodeposition processes are disclosed in U.S. Pat. Nos. 3,922,253; 4,419,467; 4,137,140; and 4,468,307 which are incorporated herein by reference.

The pigment dispersant is an important part of an electrocoat primer composition. The dispersion process involves the separation of the primary pigment particles from their agglomerates or aggregates, the displacement of occluded air and absorbed water, and the wetting and coating of the pigment surfaces with the dispersion resin. Ideally, each primary particle, having been mechanically separated during dispersion, is also stabilized against flocculation. If the pigment particles are not properly dispersed and stabilized in the paint, the advantages built into the pigment by the manufacturer may be lost. For instance, the pigment may settle in the electrodeposition bath which can result in loss of corrosion protection of the substrate In addition, surface appearance, operating characteristics and the like may be adversely impacted by inadequate pigment dispersion.

All previous pigment pastes for cathodic electrocoat processes contain water to reduce the viscosity and to make the paste easier to grind. (U.S. Pat. No. 4,110,292 discloses using a solvent based pigment paste which is incorporated into a non-electrocoat latex paint). However, pigment pastes containing water can cause foaming in the pigment paste and/or flocculation of the pigment under certain circumstances. Foaming can be a serious problem for the following reasons: (1) foaming makes it more difficult to grind pigment; (2) foaming makes it difficult to check the pigment particle size; (3) foaming makes it more difficult to unload the pigment paste from the grinding mill; and (4) foaming can introduce surface defects on the film or coating deposited by the electrocoating process.

An additive can be used in an attempt to solve a foaming problem. However, there are no satisfactory defoamers for use in making water based pigment pastes. Furthermore, the defoamers that are available can cause corrosion problems and adhesion loss of the topcoat to the electrocoated film.

What is needed is to eliminate or substantially reduce foaming during the process for making pigment pastes which are used in a cathodic electrocoating bath.

SUMMARY OF THE INVENTION

It has been discovered that foaming can be eliminated or substantially reduced in making the pigment paste used in a cathodic electrocoating bath of a coating composition containing an epoxy-amine adduct and a blocked polyisocyanate by replacing the water in the pigment paste with an organic solvent.

DETAILED DESCRIPTION OF THE INVENTION

This invention relates to a novel nonaqueous pigment paste for use in cathodic electrocoat.

As previously mentioned, it is well known the emulsion in cathodic electrodeposition baths has a binder resin which is an epoxy amine adduct blended with a cross-linking agent and neutralized with an acid to provide a water soluble cationic product. The novel pigment dispersant is potentially usable with a variety of different cathodic electrocoat binder resins. A typical binder resin is the epoxy amine adduct of the prior art. These resins are disclosed in U.S. Pat. No. 4,419,467 which is incorporated herein by reference.

Likewise our preferred crosslinkers for the above-mentioned binder resins are also well known in the prior art. They are aliphatic and aromatic isocyanates such as hexamethylene diisocyanate, toluene diisocyanate, methylene diphenyl diisocyanate and the like. These isocyanates are pre-reacted with a blocking agent to form a blocked isocyanate. Typical blocking agents are oximes and alcohols which block the isocyanate functionality (i.e. the crosslinking functionality of the isocyanate). Upon heating the oximes or alcohols unblock and free isocyanate is formed which in turn reacts with the hydroxy functionality of the epoxy-amine adduct after application to a substrate to give a crosslinked finish. These crosslinking agents are also disclosed in U.S. Pat. No. 4,419,467.

The neutralization of the epoxy-amine adduct of the binder resin with an acid to attain its cationic character is likewise well known in the art. The resulting binder resin is combined with pigment paste, deionized water and additives (e.g. anti-cratering agents, plasticizers and the like) to form the electrodeposition bath.

The main ingredients in the principal emulsion are the epoxy amine adduct and the blocked isocyanate, and are usually present in amounts of about 30 to 50 percent by weight of solids.

Besides the resinous ingredients described above, the electrocoating composition of this invention contains a pigment which is incorporated into the composition in the form of a paste. The pigment paste is prepared by mixings the pigments with a pigment dispersant resin and organic solvents along with optional additives such as wetting agents, surfactants, and defoamers and grinding the resulting mixture in a conventional grinding mill.

Pigment dispersant resins and the optional additives discussed above are well known in the art. Potentially any pigment dispersant resin which is water soluble can be used. Water solubility of the pigment dispersant resin is necessary because it will be incorporated into the water based cathodic electrocoat bath. Pigment dispersant resins well known in the art include quaternary ammonium salts, epoxy-amine adducts and imidazoline based resins. Our preferred pigment dispersant resin is a nonionic dispersant (ethoxylated styrenated phenol) which is disclosed in copending application Ser. No. 07/483,838 filed Feb. 23, 1990 now U.S. Pat. No. 5,035,785 issued Jul. 30, 1991. The weight ratio of pigment to dispersant resin ranges from 0.2:1.0 to 5.0:1.0.

The organic solvents used to replace water in the pigment paste can be either alcoholic or nonalcoholic. The preferred solvents are alcoholic. Solvents which can be used include N-methyl pyrrolidone, methyl isobutyl ketone, methyl ethyl ketone, 2-butoxy ethanol and the like. Of this group of solvents, the most preferred is 2-butoxy ethanol.

One particularly preferred solvent is 2,4 pentanedione. When 2,4 pentanedione is used as the solvent to form the pigment paste, a lesser amount can be used in comparison to the above solvents. Surprisingly, 2,4 pentanedione reduces the viscosity of the pigment paste and less can be used, thereby reducing the VOC (volatile organic compound) of resulting composition. Also, dibutyl tin oxide (DBTO) which is a catalyst that is commonly used in electrocoating compositions can be dissolved in 2,4 pentanedione and substantially reduces the time required to form a pigment paste which is generally formed by grinding using conventional techniques such as sand grinding or ball mill grinding. The aforementioned solvents do not dissolve DBTO which is difficult to disperse and hence longer grinding times were needed to form a pigment paste containing DBTO.

The amount of 2,4 pentanedione used can be from 20 to 100% of the solvent used to form the pigment paste. Preferably, about 30–70% 2,4 pentanedione is used and the remainder is one or a mixture of the aforementioned alcoholic or non-alcoholic solvents. One preferred solvent blend is a 50:50 blend of 2,4 pentanedione and 2-butoxy ethanol.

The pigment paste is prepared by adding pigments to the pigment dispersant under sufficient agitation and then adding sufficient amount of the organic solvent to give a viscosity of 500 to 3000 (cps) centipoise. The preferred viscosity is between 900 and 1500 cps and most preferred is about 2200 centipoise. This mixture is ground in any grinding mill, such as a sand grinder or ball mill.

After grinding, the particle size of the pigment should be as small as practical, generally, a Hegman grinding gauge of about 6 to 8 is usually employed.

In one preferred method for forming a pigment paste, all orgnaic solvents, grinding resins and pigments are premixed preferably by a high speed agitator and then the ingredients are charged into a sand mill and ground to form the pigment paste. If DBTO is used, it is mixed with 2,4 pentanedione in the premix. The DBTO is readily dissolved in 2,4 pentanedione with high speed agitation and then the remaining ingredients are added and mixed and ground in a sand mill. The grinding time is greatly reduced in comparison to pigment pastes prepared without 2,4 pentanedione and a good pigment paste can be made with only one pass through a sand mill whereas it normally takes 2 to 3 passes to disperse DBTO without the presence of 2,4 pentanedione. Total weight solids of these pigment pastes are about 70–90% and the viscosity of the pigment paste is about 700–2000 cps. A low VOC electrocoating composition can be prepared using pigment pastes made with 2,4 pentanedione.

Pigments which can be employed in the practice of this invention include titanium dioxide, basic lead silicate, strontium chromate, carbon black, iron oxide, clay and the like or mixtures thereof. These are the pigments typically used in automotive primers.

The pigment paste is then added to the principal emulsion containing the binder resin and other additives. The pigment-to-resin weight ratio in the electrocoat paint bath is very important and should be preferably less than 50:100, more preferably less than 40:100, and usually about 20 to 40:100. Higher pigment-to-resin solids weight ratios have been found to adversely affect coalescence and flow.

The coating compositions of the invention can contain optional additives such as wetting agents, surfactants, defoamers and so forth. Examples of surfactants and wetting agents include alkyl imidazolines such as those available from Ciba-Geigy Industrial Chemicals as Amine C ®, acetylenic alcohols available from Air Products and Chemicals as Surfynol 104 A ®. These optional ingredients, when present, constitute from about 0.1 to 20 percent by weight of resin solids. Plasticizers which promote flow of the coating on curing are optional ingredients. Examples are high boiling water immiscible materials such as ethylene or propylene oxide adducts of nonyl phenols or bisphenol A. Plasticizers can be used at levels of about 0.1 to 15 percent by weight resin solids.

Curing catalysts such as tin catalysts are usually present in the composition. Examples are dibutyl tin dilaurate and dibutyl tin oxide. When used, they are typically present in amounts of about 0.05 to 2 percent by weight tin based on weight of total resin solids.

The electrodepositable coating compositions of the present invention are dispersed in aqueous medium. The term "dispersion" as used within the context of the present invention is believed to be a two-phase translucent or opaque aqueous resinous system in which the resin is in the dispersed phase and water the continuous phase. The average particle size diameter of the resinous phase is about 0.1 to 10 microns, preferably less than 5 microns. The concentration of the resinous products in the aqueous medium is, in general, not critical, but ordinarily the major portion of the aqueous dispersion is water. The aqueous dispersion usually contains from about 3 to 50 percent preferrably 5 to 40 percent by weight resin solids. Aqueous resin concentrates which are to be further diluted with water, generally range from 10 to 30 percent by total weight solids.

Besides water, the aqueous medium may also contain a coalescing solvent. Useful coalescing solvents include hydrocarbons, alcohols, esters, ethers and ketones. The preferred coalescing solvents include alcohols, polyols and ketones. Specific coalescing solvents include monobutyl and monohexyl ethers of ethylene glycol, and phenyl ether of propylene glycol. The amount of coalescing solvent is not unduly critical and is generally between about 0 to 15 percent by weight, preferably about 0.5 to 5 percent by weight based on total weight of the resin solids.

The following examples illustrate the invention. All parts and percentages are on a weight basis unless indicated otherwise.

EXAMPLE 1

Epoxy-Amine Adduct

The following components were charged into a suitable reactor vessel: 1,478 parts Epon 828 ® (a diglycidyl ether of Bisphenol A from Shell Chemical Company having an epoxy equivalent weight of 188); 533 parts of ethoxylated Bisphenol A having a hydroxyl equivalent weight of 247 (Synfac 8009 ® from Milliken Co.); 427 parts Bisphenol A; and 121 parts xylene. The charge is heated to 145° C. under a nitrogen blanket. 2.5 parts of benzyl dimethylamine are added. The reaction mixture was further heated to 160° C., and held for 1 hours. An additional 5.1 parts of benzyl dimethylamine were added, and the mixture held at 147° C. until a 1,040 weight per epoxide (WPE) was obtained. The mixture was cooled to 98° C. and 168 parts diketimine (from diethylenetriamine and methyl isobutyl ketone at 72.7% solids) and 143 parts methyl ethanol amine were added. The mixture was held at 120° C. for 1 hours, then 727 parts methyl isobutyl ketone (MIBK) were added. The resulting epoxy-amine adduct resin solution has a non-volatile of 75%.

Crosslinking Resin

A blocked polyisocyanate was prepared by charging 522.0 parts of toluene diisocyanate ("Mondur" TD 80 from Mobay Chemical Company) into a suitable reaction vessel. 0.15 parts of dibutyl tin dilaurate and 385.2 parts anhydrous methyl isobutyl ketone were added and the resulting reaction mixture was blanketed with nitrogen. 390.0 parts of 2-ethyl hexanol was added to the mixture and the mixture was held at 60° C. 133.8 parts of trimethylol propane were added and the mixture was held at 120° C. for one hour until essentially all free isocyanate was consumed. Then 63.0 parts butanol was added and the mixture was cooled to room temperature. The resulting blocked polyisocyanate mixture had a 70.0% non-volatile content. An emulsion was prepared as follows:

|  | Weight | Solids |
| --- | --- | --- |
| Epoxy-Amine Adduct Resin Solution | 563.33 | 422.50 |

|  | Weight | Solids |
| --- | --- | --- |
| (prepared above) |  |  |
| Crosslinking Resin Solution | 325.00 | 227.50 |
| (prepared above) |  |  |
| Lactic acid | 23.73 | — |
| Deionized water | 949.65 |  |
| Total | 1861.71 | 650.00 |

The epoxy-amine adduct, the crosslinking resin solution and lactic acid were thoroughly mixed. Mixing was continued until a majority of the organic ketone evaporated. The resulting emulsion had a solids content of 36%.

A pigment paste was prepared as follows:

|  | Weight | Solids |
| --- | --- | --- |
| (Ethyloxated styrenated phenols | 236 | 236 |
| 2-butoxy ethanol | 175 | — |
| Titanium dioxide pigment | 410 | 410 |
| Aluminum silicate pigment | 76 | 76 |
| Carbon black pigment | 12 | 12 |
| Lead silicate pigment | 47 | 47 |
| Dibutyl tin oxide | 44 | 44 |
| Total | 1000 | 825 |

The ethoxylated styrenated phenol and 2-butoxy ethanol were charged into a steel container and mixed with a Cowles Blade Mixer at medium speed. The pigments were then added and the mixture passed through a sand grinder until a Hegman grinding gauge of about 7 was achieved.

An electrocoat bath was prepared as follows:

|  | Weight | Solids |
| --- | --- | --- |
| Emulsion (prepared above) | 1693.33 | 609.60 |
| Pigment paste (prepared above) | 230.79 | 190.40 |
| Deionized water | 2075.88 | — |
| Total | 4000.00 | 800.00 |

An electrocoating bath was prepated by blending together the above ingredients. The bath had a pH of 6.08 and a conductivity of 200 microseman. Zinc phosphate cold-rolled steel panels were cathodically electrocoated in the bath at 200 volts and 28° C. for 2 minutes. The wet films were cured at 180° C. for 15 minutes and had 32 micron film thickness and were smooth and even.

EXAMPLE 2

A pigment paste was prepared as follows:

|  | Weight | Solids |
| --- | --- | --- |
| Synfac 8334 ® | 236 | 236 |
| (Ethyloxated styrenated phenols from Milliken Chemical Company) |  |  |
| 2-Butoxy ethanol | 73 | — |
| 2,4 Pentanedione | 73 | — |
| Titanium dioxide pigment | 410 | 410 |
| Aluminum silicate pigment | 76 | 76 |
| Carbon black pigment | 12 | 12 |
| Lead silicate pigment | 47 | 47 |
| Dibutyl tin oxide | 44 | 44 |
| Total | 971 | 825 |

Dibutyl tin oxide and 2,4 pentanedione were charged into a steel container and mixed with a Cowles Blade Mixer at medium speed until all dibutyl tin oxide is dissolved. Synfac 8334®, 2-butoxy ethanol, and the pigments were charged and mixed. The mixture passed through a sand grinder once, and a Hegman grinding gauge of about 7 was achieved.

An electrocoat bath was prepared as follows:

|  | Weight | Solids |
|---|---|---|
| Emulsion (prepared in Example 1) | 1693.33 | 609.60 |
| Pigment paste (prepared in Example 1) | 224.10 | 190.40 |
| Deionized water | 2082.57 | — |
| Total | 4000.00 | 800.00 |

An electrocoating bath was prepared by blending together the above ingredients. The bath had a pH of 6.0 and a conductivity of 210 microseman. Zinc phosphate cold-rolled steel panels were cathodically electrocoated in the bath at 200 volts and at 28° C. for 2 minutes. The wet films were cured at 180° C. for 15 minutes and had 34 micron film thickness and were smooth and even.

We claim:

1. In a cathodic electrodepositable coating composition comprising:
   a) an epoxy-amine adduct;
   b) a blocked polyisocyanate crosslinker; and
   c) a pigment paste;
wherein the improvement comprises the pigment paste of a nonaqueous mixture comprising pigment, a water soluble pigment dispersant resin consisting essentially of an ethoxylated styrenated phenol, and organic solvent.

2. The cathodic electrodepositable coating composition of claim 1 wherein the weight ratio of pigment to pigment dispersant resin is 0.2:1.0 to 5.0:1.0.

3. The cathodic electrodepositable coating composition of claim 2 wherein the organic solvent is selected from the group consisting of N-methyl pyrrolidone, methyl isobutyl ketone, methyl ethyl ketone, 2-butoxy ethanol and 2,4 pentanedione.

4. The cathodic electrodepositable coating composition of claim 3 wherein the organic solvent is 2-butoxy ethanol.

5. The cathodic electrodepositable coating composition of claim 3 wherein the organic solvent is 2,4 pentanedione.

6. The cathodic electrodepositable coating composition of claim 3 wherein the organic solvent is a mixture of 2-butoxy ethanol and 2,4 pentanedione.

7. The cathodic electrodepositable coating composition of claim 3 wherein the organic solvent comprises 30–70% by weight of 2,4 pentanedione and correspondingly 70–30% by weight of one of the other organic solvents of claim 3 or any compatible mixture of these solvents.

8. The cathodic electrodepositable coating composition of claim 2 wherein the water soluble pigment dispersant resin is nonionic resin.

9. The cathodic electrodepositable coating composition of claim 8 wherein the water soluble pigment dispersant resin is an ethoxylated styrenated phenol.

10. A method of preparing a nonaqueous pigment paste to be incorporated into a cathodic electrocoat composition comprising the following steps:
    a) mixing in any order pigment, water soluble pigment dispersant resin consisting essentially of an ethoxylated styrenated phenol and organic solvent so that the mixture is substantially nonaqueous and the weight ratio of pigment to pigment dispersant resin is 0.2:1.0 to 5.0:1.0 and the viscosity of the mixture is 500 to 3000 centipoise;
    b) grinding the mixture from a) so that the pigment has a particle size represented by a Hegman grinding gauge of about 6 to 8.

11. The method of claim 10 wherein the organic solvent is selected from the group consisting of N-methyl pyrrolidone, methyl isobutyl ketone, methyl ethyl ketone, 2-butoxy ethanol, 2,4 pentanedione or mixtures thereof.

12. The method of claim 11 wherein the organic solvent is selected from the group consisting of 2-butoxy ethanol, 2,4 pentanedione or mixtures thereof.

13. The method of claim 10 wherein the water soluble pigment dispersant is nonionic.

14. The cathodic electrodepositable coating composition of claim 13 wherein the water soluble pigment dispersant resin is an ethoxylated styrenated phenol.

* * * * *